B. MORGAN.
TIRE CLAMP.
APPLICATION FILED DEC. 4, 1909.

977,212.

Patented Nov. 29, 1910.

WITNESSES:

INVENTOR
Bernard Morgan
BY
ATTORNEYS

UNITED STATES PATENT OFFICE.

BERNARD MORGAN, OF NEWPORT, RHODE ISLAND.

TIRE-CLAMP.

977,212.   Specification of Letters Patent.   Patented Nov. 29, 1910.

Application filed December 4, 1909. Serial No. 531,317.

*To all whom it may concern:*

Be it known that I, BERNARD MORGAN, a subject of the King of Great Britain and Ireland, and a resident of Newport, in the county of Newport and State of Rhode Island, have invented a new and Improved Tire-Clamp, of which the following is a full, clear, and exact description.

This invention relates to certain improvements in tools for use in replacing vehicle tires upon the rims, and the object of the invention is to provide an improved means for positively and effectively clamping the tire to the rim at a point along the length of the tire, so that the flanges of the tire cannot become accidentally disengaged from the clencher flange of the rim while adjacent portions of the flange of the tire are being placed in position. My improved device may be used in connection with any common form of pneumatic tire which has a removable shoe and a clencher rim, and does not necessitate any change whatsoever in either the tire or the rim. It may be readily applied whenever a tire is to be replaced upon the rim, and when the tire is completely replaced the tool may be easily disengaged and removed.

Reference is to be had to the accompanying drawings, forming a part of this specification, in which similar characters of reference indicate corresponding parts in both the figures, and in which—

Figure 1:
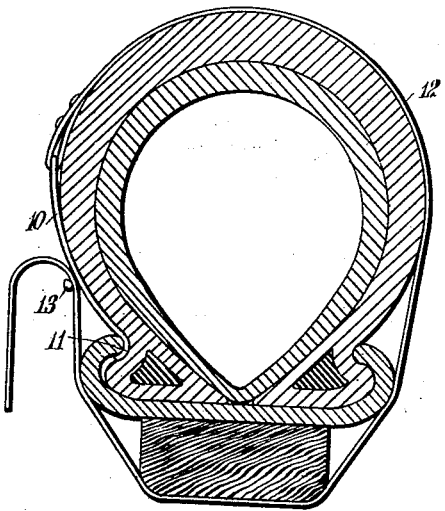
Figure 2:
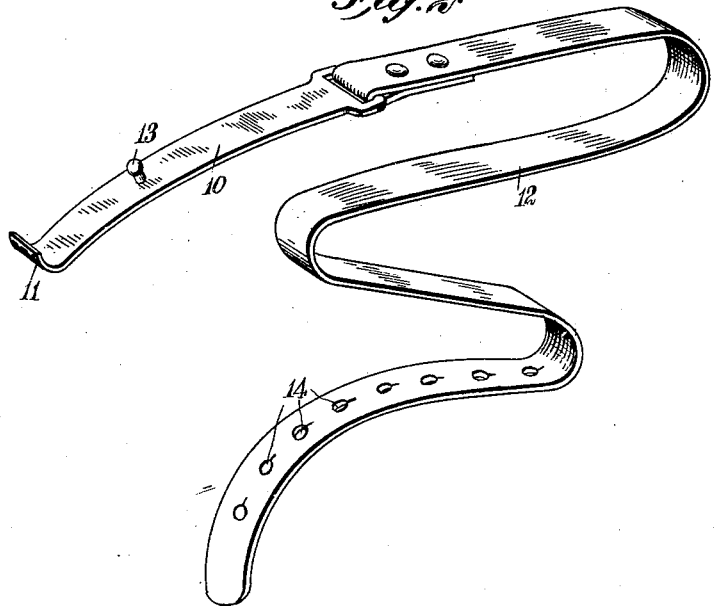

Figure 1 is a transverse section through a tire and rim, showing my improved device in operative position; and Fig. 2 is a perspective view of the device *per se*.

My improved tool in its preferred form includes a band, strip, or bar 10, of metal, preferably iron, and of such thickness and width that it cannot readily be bent or broken. The bar is curved to such an extent that one of the flat sides thereof when brought into engagement with the outer surface of the tire or shoe, will substantially follow the curvature of the latter. The bar at one end is bent or curved outwardly to form a hook 11, of such size that it may be engaged beneath the flange of the clencher rim. A strap 12 of leather, canvas, or any other suitable flexible material, has one end thereof permanently secured to the end of the bar 10 opposite the hook 11, and the strap is of such length that it together with the bar, will somewhat more than encircle the ordinary felly rim and tire of an automobile wheel. Intermediate the ends of the bar 10 and upon the outer surface thereof, is a stud or button 13, adapted to be received within any one of a series of buttonholes or apertures 14 in the free end of the strap.

In employing my improved tool, the outer tire or shoe is placed on the rim with one of the side beads of the shoe in proper operative engagement with the coacting part of the clencher rim. The second bead is now forced into position at one point along its length, and the hook end 11 of the bar 12 is caught into the bead of the rim at this point, to hold the bead of the shoe in position. The strap 12 is wrapped around the tire rim and felly, and is pulled tight and fastened to the stud or button 13. This positively prevents the bead of the shoe which was last placed in position, from accidentally springing out of place when it is attempted to force the adjacent portions of the same bead of the shoe into place. With the tire positively clamped in place at one point along its length, the remainder of the bead of the shoe may be brought into place by working from this clamp point, without liability of any portion of the second bead of the tire accidentally slipping out after once being placed in position.

Having thus described my invention, I claim as new and desire to secure by Letters Patent:

1. A device of the class described, comprising a bar having one end adapted to engage with the flange of the clencher rim, a strap secured to the opposite end of said bar, and means for attaching the opposite end of the strap to said bar.

2. A device of the class described, comprising a curved bar having one end thereof bent outwardly to form a hook, and having a stud or button upon the outer surface intermediate the ends of the bar, and a flexible strap having one end thereof secured to said bar at the end opposite to said hook and the free end of said strap having a series of apertures or recesses adapted to engage with said stud.

In testimony whereof I have signed my name to this specification in the presence of two subscribing witnesses.

BERNARD MORGAN.

Witnesses:
ANNIE G. MARTIN,
ALEXANDER O'D. TAYLOR.